(12) United States Patent
Yang (10) Patent No.: US 12,504,783 B2
(45) Date of Patent: Dec. 23, 2025

(54) INWARD FOLDING ELECTRONIC DEVICE

(71) Applicant: VIVO MOBILE COMMUNICATION CO., LTD., Guangdong (CN)

(72) Inventor: Wenqiang Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 171 days.

(21) Appl. No.: 18/487,061

(22) Filed: Oct. 14, 2023

(65) Prior Publication Data

US 2024/0036603 A1    Feb. 1, 2024

Related U.S. Application Data

(63) Continuation of application No. PCT/CN2022/086109, filed on Apr. 11, 2022.

(30) Foreign Application Priority Data

Apr. 15, 2021 (CN) .......................... 202110407116.7

(51) Int. Cl.
*G06F 1/16* (2006.01)
*H05K 5/02* (2006.01)

(52) U.S. Cl.
CPC .......... *G06F 1/1618* (2013.01); *G06F 1/1652* (2013.01); *G06F 1/1681* (2013.01); *H05K 5/0226* (2013.01)

(58) Field of Classification Search
CPC .... G06F 1/1618; G06F 1/1652; G06F 1/1681; G06F 1/1637; G06F 1/1641;
(Continued)

(56) References Cited

U.S. PATENT DOCUMENTS 10,228,729 B2 * 3/2019 Yamazaki ............... G06F 1/181
D913,282 S * 3/2021 Song ............................ D14/371
(Continued)

FOREIGN PATENT DOCUMENTS

CN    108600431 A    9/2018
CN    108845621 A    11/2018
(Continued)

OTHER PUBLICATIONS

First Office Action for Chinese Application No. 202110407116. 7, dated Jul. 27, 2022, 7 Pages.
(Continued)

*Primary Examiner* — Dmitriy Bolotin
(74) *Attorney, Agent, or Firm* — BROOKS KUSHMAN P.C.

(57) ABSTRACT

An inward folding electronic device includes a first housing, a second housing, and a flexible display module; where a first area of the flexible display module is a semi-transparent and semi-reflective display area, where the first area is corresponding to a connecting area between the first housing and the second housing; and in a case that the electronic device is in an unfolded state, the semi-transparent and semi-reflective display area displays information at a side facing away from the first housing and the second housing; and in a case that the electronic device is in a folded state, the semi-transparent and semi-reflective display area displays information at a side facing towards the first housing and the second housing.

20 Claims, 8 Drawing Sheets

(58) Field of Classification Search
CPC ......... H05K 5/0226; G09F 9/301; G09F 9/33; H10K 59/12; H10K 77/111; H10K 59/122; H10K 59/8051; H10K 59/8052; H10K 59/878; G09G 3/035; G09G 3/3208; G09G 2380/02
See application file for complete search history.

(56) References Cited

U.S. PATENT DOCUMENTS

| | | | |
|---|---|---|---|
| 10,957,867 B2* | 3/2021 | Jeong | B32B 15/04 |
| 11,188,120 B2* | 11/2021 | Myung | G06F 1/162 |
| 11,402,870 B2* | 8/2022 | Choi | G09F 9/301 |
| 12,014,657 B2* | 6/2024 | Feng | G09F 9/301 |
| 12,041,193 B2* | 7/2024 | Cha | H04M 1/0247 |
| 12,071,500 B2* | 8/2024 | Fujiwara | C08F 279/02 |
| 12,120,911 B2* | 10/2024 | Kim | G06F 1/1652 |
| 12,164,332 B2* | 12/2024 | Park | G06F 1/1641 |
| 12,272,271 B2* | 4/2025 | Eguchi | G06F 1/1652 |
| 12,277,013 B2* | 4/2025 | Lee | G06F 1/1652 |
| 2016/0212840 A1* | 7/2016 | Koo | G06F 1/1652 |
| 2017/0023979 A1* | 1/2017 | Yamazaki | G06F 1/181 |
| 2017/0358252 A1 | 12/2017 | Bhageria et al. | |
| 2020/0333845 A1 | 10/2020 | Yug et al. | |
| 2020/0350384 A1 | 11/2020 | Park et al. | |
| 2022/0209175 A1 | 6/2022 | Tian et al. | |

FOREIGN PATENT DOCUMENTS

| | | |
|---|---|---|
| CN | 108874041 A | 11/2018 |
| CN | 209017107 U | 6/2019 |
| CN | 110493387 A | 11/2019 |
| CN | 111010520 A | 4/2020 |
| CN | 111430414 A | 7/2020 |
| CN | 111755496 A | 10/2020 |
| CN | 111756895 A | 10/2020 |
| CN | 111882985 A | 11/2020 |
| CN | 211981915 U | 11/2020 |
| CN | 212322551 U | 1/2021 |
| CN | 112383653 A | 2/2021 |
| CN | 113129753 A | 7/2021 |
| KR | 20180071900 A | 6/2018 |

OTHER PUBLICATIONS

International Search Report and Written Opinion for Application No. PCT/CN2022/086109, dated Aug. 31, 2022, 9 Pages.

* cited by examiner

INWARD FOLDING ELECTRONIC DEVICE

CROSS-REFERENCE TO RELATED APPLICATIONS

This application is a continuation of International Application No. PCT/CN2022/086109 filed on Apr. 11, 2022, which claims priority to Chinese Patent Application No. 202110407116.7 filed on Apr. 15, 2021, which are incorporated herein by reference in their entireties.

TECHNICAL FIELD

This application pertains to the field of display technologies, and specifically, relates to an inward folding electronic device.

BACKGROUND

At present, with the maturation of flexible electronic screen technologies using organic light-emitting diodes (OLEDs), inward folding electronic devices have gradually become mainstream products.

In the prior art, in a case that an inward folding electronic device is in a folded state, users are unable to continue viewing the content displayed on an inward folding screen which serves as the main screen. To avoid missing important notifications or the cumbersome operation of frequently flipping open the main screen, it is necessary to design a secondary screen on the non-main screen display area at the back of the inward folding electronic device to display information in the folded state. However, this approach not only increases the material cost but also weakens the overall reliability of the device.

SUMMARY

According to a first aspect, an embodiment of this application provides an inward folding electronic device including a first housing, a second housing, and a flexible display module; where
  the flexible display module is provided on surfaces of the first housing and the second housing at one side, and a first area of the flexible display module is a semi-transparent and semi-reflective display area, where the first area is corresponding to a connecting area between the first housing and the second housing; and
  in a case that the electronic device is in an unfolded state, the semi-transparent and semi-reflective display area displays information at a side facing away from the first housing and the second housing; and in a case that the electronic device is in a folded state, the semi-transparent and semi-reflective display area displays information at a side facing towards the first housing and the second housing.

According to a second aspect, an embodiment of this application provides a display control method, where the display control method is used for controlling display of the inward folding electronic device described above, where the display control method includes:
  controlling the semi-transparent and semi-reflective display area to display first display content towards a first direction in a case that the inward folding electronic device is in an unfolded state; where the first direction is a direction of a side of the semi-transparent and semi-reflective display area facing away from the first housing and the second housing; and
  controlling the semi-transparent and semi-reflective display area to display second display content towards a second direction in a case that the inward folding electronic device is in a folded state; where the second direction is a direction of a side of the semi-transparent and semi-reflective display area facing towards the first housing and the second housing.

According to a third aspect, an embodiment of this application provides a chip, where the chip includes a processor and a communications interface, the communication interface is coupled to the processor, and the processor is configured to run a program or instructions to implement the method according to the second aspect.

According to a fourth aspect, an embodiment of this application provides a readable storage medium, where the readable storage medium stores a program or instructions, and when the program or instructions are executed by a processor, the steps of the display control method according to claim 11 are implemented.

According to a fifth aspect, an embodiment of this application provides an electronic device, the electronic device being the inward folding electronic device according to the first aspect, where the electronic device further includes a processor, a memory, and a program or instructions stored in the memory and capable of running on the processor. When the program or instructions are executed by the processor, the steps of the display control method according to the second aspect are implemented.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the terms used in this way are interchangeable in appropriate circumstances so that the embodiments of this application can be implemented in other orders than the order illustrated or described herein. In addition, "and/or" in the specification and claims represents at least one of connected objects, and the character "/" generally indicates that the associated objects have an "or" relationship.

The following describes in detail the inward folding electronic device provided in the embodiments of this application through specific embodiments and application scenarios thereof with reference to the accompanying drawings.

Refer to FIGS. 1 to 6. The foregoing inward folding electronic device 10 includes a first housing 11, a second housing 12, and a flexible display module 14; where the flexible display module 14 is provided on surfaces of the first housing 11 and the second housing 12 at one side, and a first area of the flexible display module 14 is a semi-transparent and semi-reflective display area 15, where the first area is corresponding to a connecting area between the first housing 11 and the second housing 12; and in a case that the inward folding electronic device 10 is in an unfolded state, the semi-transparent and semi-reflective display area 15 displays information at a side facing away from the first housing 11 and the second housing 12; and in a case that the inward folding electronic device 10 is in a folded state, the semi-transparent and semi-reflective display area 15 displays information at a side facing towards the first housing 11 and the second housing 12.

According to the inward folding electronic device 10 provided in an embodiment of this application, the flexible display module 14 is provided on surfaces of the first housing 11 and the second housing 12 at one side, and specifically, provided on inner surfaces of the first housing 11 and the second housing 12. Thus, by the relative folding between the first housing 11 and the second housing 12, the flexible display module 14 is driven to be folded inward between the first housing 11 and the second housing; or, by the relative unfolding between the first housing 11 and the second housing 12, the flexible display module 14 is driven to be unfolded outward, thus achieving the folding or unfolding of the inward folding electronic device.

According to the inward folding electronic device 10 provided in an embodiment of this application, the display area of the flexible display module 14 at the connecting area between the first housing 11 and the second housing 12 is configured as a semi-transparent and semi-reflective display area 15. In a case that the electronic device is in the unfolded state, the semi-transparent and semi-reflective display area 15 can display information at the side facing away from the first housing 11 and second housing 12; while in a case that the electronic device is in the folded state, the semi-transparent and semi-reflective display area 15 can display information at the side facing towards the first housing 11 and second housing 12. This enables the display content to be observed on both the front and back of the semi-transparent and semi-reflective display area 15, solving the problem of unable to utilize the folded display for information display in a case that the inward folding electronic device is in the folded state. Additionally, a secondary display is not required, reducing material costs and enhancing the overall reliability of the device.

The inward folding electronic device 10 provided in the embodiments of this application can specifically be a mobile phone, a tablet computer, and the like.

In the embodiments of this application, the first housing 11 and the second housing 12 form the main structure of the inward folding electronic device 10. Optionally, in one implementation, the first housing 11 and the second housing 12 are pivotally connected, and the flexible display module 14 is provided on surfaces of the first housing 11 and the second housing 12 at one side, so that the folding and unfolding of the first housing 11 and the second housing 12 to be achieved through rotation. This allows for a more stable and smooth folding and unfolding of the flexible display module.

Optionally, in one implementation, the electronic device further includes at least two sets of hinge mechanisms 13. The first housing 11 and the second housing 12 are pivotally connected through the at least two sets of hinge mechanisms 13. The first housing 11 and the second housing 12 are hinged through the at least two sets of hinge mechanisms 13, and the at least two sets of hinge mechanisms 13 together with the first housing 11 and the second housing 12 enclose a hollow area. Additionally, the flexible display module 14 is connected to the first housing 11 and the second housing 12, that is, the flexible display module 14 is fixedly attached across the hollow area to the first housing 11 and the second housing 12 and is located at the same side of the first housing 11 and the second housing 12. In this way, the first housing 11 and the second housing 12 can rotate relative to each other through the hinge mechanisms 13 and drive the flexible module to fold towards the side where the flexible display module 14 is located to achieve the folded state or to unfold towards the side where the flexible display module 14 is located to achieve the unfolded state.

The display area of the flexible display module 14 corresponding to the connecting area between the first housing 11 and the second housing 12 is configured as the semi-transparent and semi-reflective display area 15. Therefore, in a case that the electronic device is in the unfolded state, the semi-transparent and semi-reflective display area 15 displays information at a side facing away from the first housing 11 and the second housing 12, and at the side of the inward folding electronic device 10 provided with the flexible display module 14, information displayed on the front of the semi-transparent and semi-reflective display area 15 can be observed, as well as information displayed in other display areas of the flexible display module 14 except for the semi-transparent and semi-reflective display area 15; while in a case that the electronic device is in the folded state, the semi-transparent and semi-reflective display area 15 displays information at a side facing towards the first housing 11 and the second housing 12, and at a side of the inward folding electronic device 10 father away from the flexible display module 14, information displayed on the other display areas cannot be observed by users due to being blocked by the first housing 11 and the second housing 12. However, because the first area where the semi-transparent and semi-reflective display area 15 is located is corresponding to the connecting area between the first housing 11 and the second housing 12, information displayed on the back of the semi-transparent and semi-reflective display area 15 can be observed through the foregoing connecting area. Therefore, in a case that the inward folding electronic device 10 is in a folded state, important information can be displayed using the semi-transparent and semi-reflective display area 15.

Optionally, in a specific implementation, the area on the first housing 11 and the second housing 12 corresponding to the first area may be configured as transparent or a hollow area, so that in a case that the electronic device is in the folded state, the information displayed on the back of the semi-transparent and semi-reflective display area 15 can be observed through the area corresponding to the first area.

Optionally, in a specific implementation, the hinge mechanism 13 includes a pivot 131, a first connecting hinge 132, and a second connecting hinge 133. The pivot 131 is provided with a groove inside. One end of the first connecting hinge 132 is fixedly connected to the first housing 11, and the other end of the first connecting hinge 132 is embedded in the groove 134. In this way, the first housing 11 is hinged to the pivot 131, and when the first housing 11 rotates around the pivot 131, the first connecting hinge 132 can slide retractably along the groove 134. One end of the second connecting hinge 133 is fixedly connected to the second housing 12, and the other end of the second connecting hinge 133 is embedded in the groove 134. In this way, the second housing 12 is hinged to the pivot 131 and when the second housing 12 rotates around the pivot 131, the second connecting hinge 133 can slide retractably along the groove 134. By the cooperation of at least two hinge mechanisms 13, the first housing 11 and the second housing 12 can be firmly hinged, thereby achieving foldability of the main structure of the electronic device. Because the flexible display module 14 is connected to the first housing 11 and the second housing 12, the flexible display module 14 can be passively folded or unfolded correspondingly with the folding or unfolding of the first housing 11 and the second housing 12. While the telescopic design of the connecting hinges and the pivot 131 ensures that the pivot 131 protrudes from the curved surface where the semi-transparent and semi-reflective display area 15 is located, which can prevent damage to the semi-transparent and semi-reflective display area 15 caused by accidental falling in the folded state.

Specifically, the pivot 131 is designed in conjunction with the connecting hinge so that in a case that the electronic device 10 is unfolded, the first housing 11 and the second housing 12 drive the flexible display module 14 to stretch along the pivot 131, making the flexible display module 14 flat as a whole. In a case that the electronic device is folded, the first housing 11 and the second housing 12 drive the flexible display module 14 to fold along the pivot 131, making the flexible display module 14 folded as a whole.

Optionally, in a specific implementation, the groove 134 is an elliptical groove. In a case that the first housing 11 and the second housing 12 are in the folded state, that is, in a case that the flexible display module 14 is in the folded state, a direction of the major axis of the elliptical groove is perpendicular to a plane where the first housing 11 is located and a plane where the second housing 12 is located. In a case that the first housing 11 and the second housing 12 are in the unfolded state, that is, in a case that the flexible display module 14 is in the unfolded state, the direction of the major axis of the elliptical groove is parallel to the plane where the first housing 11 is located and the plane where the second housing 12 is located. The foregoing configuration allows for a larger folding radius of the flexible display module 14 and reduces the likelihood of creases.

In the above specific implementation, the groove 134 is designed as an elliptical shape, so that in the unfolded state, the connecting hinges are pulled to the two ends of the major axis of the elliptical groove; in the folded state, the connecting hinges return to the short axis of the elliptical groove, causing twice the length of the entire inward folding electronic device 10 in the folded state to be slightly smaller than the length of the major axis of the entire inward folding electronic device in the unfolded state.

According to the inward folding electronic device 10 provided in the embodiment of this application, the first housing 11 and the second housing 12 are hinged by at least two sets of hinge mechanisms 13. In a case of two sets of hinge mechanisms 13, the two sets of hinge mechanisms 13 are respectively provided on two sides of the flexible display module 14. This not only maximizes the hollow area enclosed by the hinge mechanisms 13, the first housing 11, and the second housing 12 but also provides complete support and protection for the area of the flexible display module 14 corresponding to the hollow area, namely, provides complete support and protection for the semi-transparent and semi-reflective display area 15.

Optionally, in an implementation, the above flexible display module 14 is an OLED display module; the above flexible display module 14 includes an OLED display component 141, an upper flexible glass 142, and a lower flexible glass 143; the upper flexible glass 142 is provided on a surface of the OLED display component 141 away from a substrate, and the lower flexible glass 143 is provided on a surface of the OLED display component 141 closer to the substrate, where the substrate is a contact surface of the first housing 11 and the second housing 12 for connecting with the flexible display module 14. By sandwiching the OLED display component 141 from the top and bottom with the upper flexible glass 142 and the lower flexible glass 143, a sandwich structure is formed, providing good support for the OLED display module and reducing the likelihood of creases and bulges in the unfolded state.

Optionally, in a specific implementation, the upper flexible glass 142 and the lower flexible glass 143 may be specifically made of ultra-thin glass (UTG), which allows the flexible display module 14 to have better bending and wear resistance performance.

Optionally, in a specific implementation, the lower flexible glass 143 is the same as the semi-transparent and semi-reflective display area 15 in the shape and size, and the lower flexible glass 143 overlaps with the semi-transparent and semi-reflective display area 15. That is, the lower flexible glass 143 is only provided in the semi-transparent and semi-reflective display area 15 in the flexible display module 14, while the other display areas in the flexible display module 14, except for the semi-transparent and semi-reflective display area 15, are provided with only the upper flexible glass 142, that is, the other display areas include only the OLED display component and the upper flexible glass, with the bottom support provided by the first housing 11 and the second housing 12. This manner of providing the lower flexible glass 143 only in the semi-transparent and semi-reflective display area 15 can save the usage of the lower flexible glass, thus further reducing costs.

Optionally, in an implementation, the reflective functional layer of the semi-transparent and semi-reflective display area 15 is positioned on the side of the semi-transparent and semi-reflective display area 15 closer to the first housing 11 and the second housing 12, so that in a case that the electronic device is in the unfolded state, the background on the other side of the electronic device is not easily visible through the semi-transparent and semi-reflective display area 15 when information displayed on the front side of the semi-transparent and semi-reflective display area 15 is being observed from the side of the electronic device where the flexible display module 14 is located, avoiding interference with the display on the front of the semi-transparent and semi-reflective display area 15 and improving the display effect.

Figure 7:
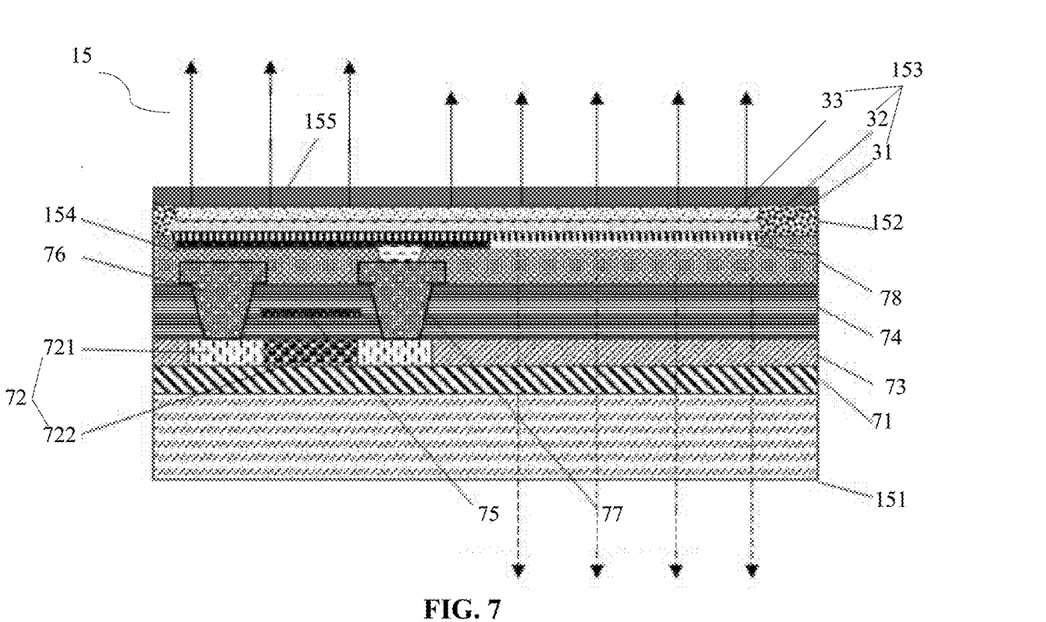
FIG. 7 is a schematic structural diagram of a semi-transparent and semi-reflective display area in an implementation according to an embodiment of this application.
Figure 8:
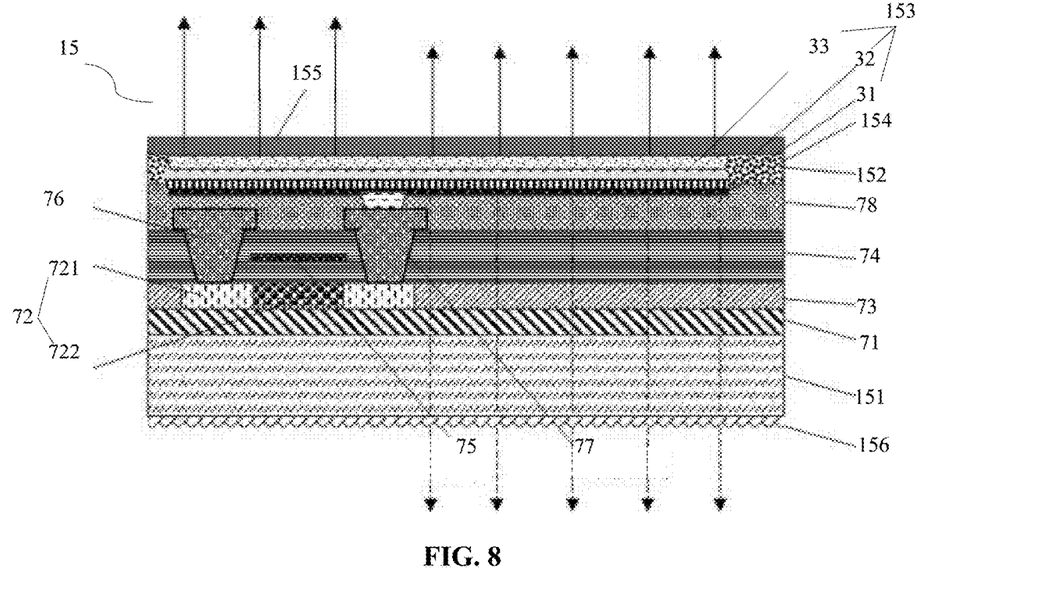
FIG. 8 is a schematic structural diagram of a semi-transparent and semi-reflective display area in another implementation according to an embodiment of this application.

Optionally, in an implementation, as shown in FIGS. 7 and 8, the semi-transparent and semi-reflective display area 15 includes a substrate 151, and a pixel defining layer 152 and a second electrode 155 which are stacked in sequence on the substrate 151; the pixel defining layer 152 includes a plurality of openings spaced apart, each of the openings being provided with a light-emitting unit 153; a first electrode 154 is provided between each light-emitting unit 153 and the substrate 151, and the light-emitting unit 153 emits light under the action of the first electrode 154 and the second electrode 155; the first electrode 154 transmits, at least partially, the light emitted by the light-emitting unit 153, so that in a case that the electronic device is in a folded state, information is displayed on a side of the semi-transparent and semi-reflective display area 15 facing towards the first housing 11 and the second housing 12; and the second electrode 155 transmits the light emitted by the light-emitting unit 153, so that in a case that the electronic device is in an unfolded state, information is displayed on a side of the semi-transparent and semi-reflective display area 15 father away from the first housing 11 and the second housing 12. The arrows represent light rays.

In the above implementation, the first electrode 154 is conductively connected or in contact with the corresponding light-emitting unit 153, acting as a driving electrode for the corresponding light-emitting unit 153. Additionally, each light-emitting unit 153 is provided with a second electrode 155 which is conductively connected or in contact with the light-emitting unit 153. The second electrode 155 serves as another driving electrode of the light-emitting unit 153. One of the first electrode 154 and the second electrode 155 is used as an anode, and the other of the first electrode 154 and the second electrode 155 is used as a cathode, to drive the corresponding light-emitting unit 153 to emit.

The second electrode 155 of the light-emitting unit 153 may be individually provided. Alternatively, a common electrode may be used directly as the second electrode 155, and specifically, an existing electrode on the side of the flexible display module 14 father away from the substrate 151 may be used as the second electrode 155. The second electrode 155 can transmit light emitted by the light-emitting unit 153, allowing the information displayed in the semi-transparent and semi-reflective display area 15 to be observed from the front of the semi-transparent and semi-reflective display area 15.

The first electrode 154 can at least partially transmit light emitted by the light-emitting unit 153, allowing the light emitted by the light-emitting unit 153 to be observed from the side with the substrate 151. This means that information displayed in the semi-transparent and semi-reflective display area 15 can be observed from the back of the semi-transparent and semi-reflective display area 15.

The light-emitting unit 153 may be an OLED pixel subunit, specifically a red, green, or blue pixel subunit.

In practical applications, the semi-transparent and semi-reflective display area 15 further includes an upper flexible glass 142 and a lower flexible glass 143.

Optionally, in a specific implementation, the first electrode 154 may be a non-transparent electrode that has undergone openwork treatment, achieving at least partial transmission of light emitted by the light-emitting unit 153; alternatively, the non-transparent electrode may be thinned to the micrometer level to serve as the first electrode 154, also achieving at least partial transmission of light emitted by the light-emitting unit 153; alternatively, a transparent electrode is used as the first electrode 154, allowing for complete transmission of light emitted by the light-emitting unit 153.

Optionally, in a specific implementation, in the inward folding electronic device 10 provided in the embodiments of this application, as shown in FIG. 8, the semi-transparent and semi-reflective display area 15 further includes an optical coating layer 156 provided on a side of the substrate 151 farther away from the first electrode 154, where the optical coating layer 156 has a transmittance and reflectance of 50% each. This can partially reflect the light emitted by the light-emitting unit 153 to the front of the semi-transparent and semi-reflective display area 15, thereby enhancing the front display effect. Additionally, this also ensures that the light emitted by the light-emitting unit 153 is partially transmitted to the back of the semi-transparent and semi-reflective display area 15, allowing information displayed in the semi-transparent and semi-reflective display area 15 to be observed from the back, that is, achieving the display effect of a semi-transparent and semi-reflective screen.

Optionally, in a specific implementation, the first electrode 154 may be configured as the anode, the second electrode 155 may be configured as the cathode, and the second electrode 155 may serve as a common electrode, facilitating using the existing cathode of the display module as a common electrode to drive the semi-transparent and semi-reflective display area 15 to emit light.

In this case, the first electrode 154 may be a patterned anode metal layer, or an anode metal layer with portions removed, or an anode metal layer thinned to a semi-transparent state, where the anode metal layer may be specifically made of aluminum.

In this case, the first electrode 154 may alternatively be an ITO anode. In this scenario, a semi-transparent and semi-reflective optical coating layer 156 needs to be provided on the side of the substrate 151 father away from the first electrode 154.

The semi-transparent and semi-reflective display area 15 further includes a plurality of thin-film transistors 157, where the plurality of thin-film transistors 157 are all positioned between the substrate 151 and the pixel defining layer 152. Each light-emitting unit 153 is connected to one of the thin-film transistors 157 through a corresponding first electrode 154. The thin-film transistor 157 is used to apply drive signals to the first electrode 154. One of the first electrode 154 and the second electrode 155 is used as an anode, and the other of the first electrode 154 and the second electrode 155 is used as a cathode. Combining this with the switching function of the thin-film transistor 157, it controls a corresponding light-emitting unit 153 to emit light or not.

The thin-film transistors mentioned above include, in sequential order above the substrate 151, a buffer layer 71, a channel layer 72, an interlayer dielectric layer 73, a gate insulating layer 74, a gate electrode 75, a source electrode (S electrode) 76 provided above the gate insulating layer, a drain electrode (D electrode) 77, and a planarization layer 78 that covers the source electrode 76, drain electrode 77, and gate electrode 75. The first electrode 154 is connected to the drain electrode 77. The channel layer 72 includes a P-type doped layer 721 and an N-type doped layer 722.

The light-emitting unit 153 includes a hole injection layer 31, a hole transport layer 32, and an organic light-emitting functional layer 33 that are stacked in sequence.

Optionally, the inward folding electronic device 10 provided in this application further includes a motherboard (not shown in the figure), where the motherboard is provided with a display interface, and the display interface is electrically connected to the flexible display module 14. The inward folding electronic device provided in the embodiments of this application in the folded state utilizes the semi-transparent and semi-reflective display area 15 in the flexible display module 14 to display information required to be displayed, therefore, only a display interface needs to be provided on the motherboard and then electrically connected to the flexible display module 14 to achieve display control of the inward folding electronic device.

Figure 1:
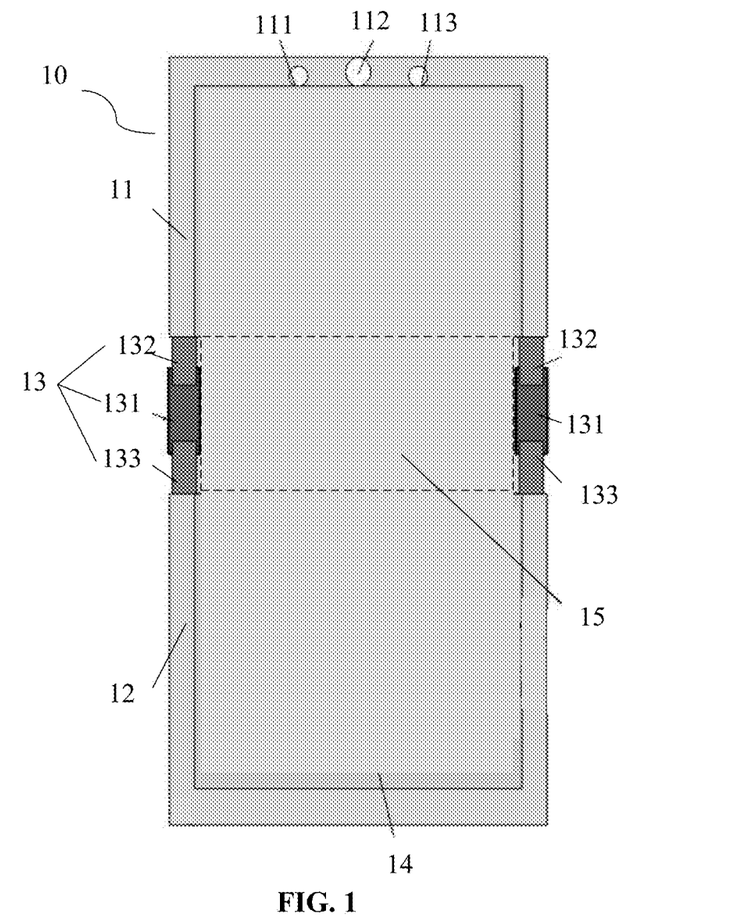
FIG. 1 is a first-angle schematic diagram of an inward folding electronic device in an unfolded state according to an embodiment of this application.
Figure 2:
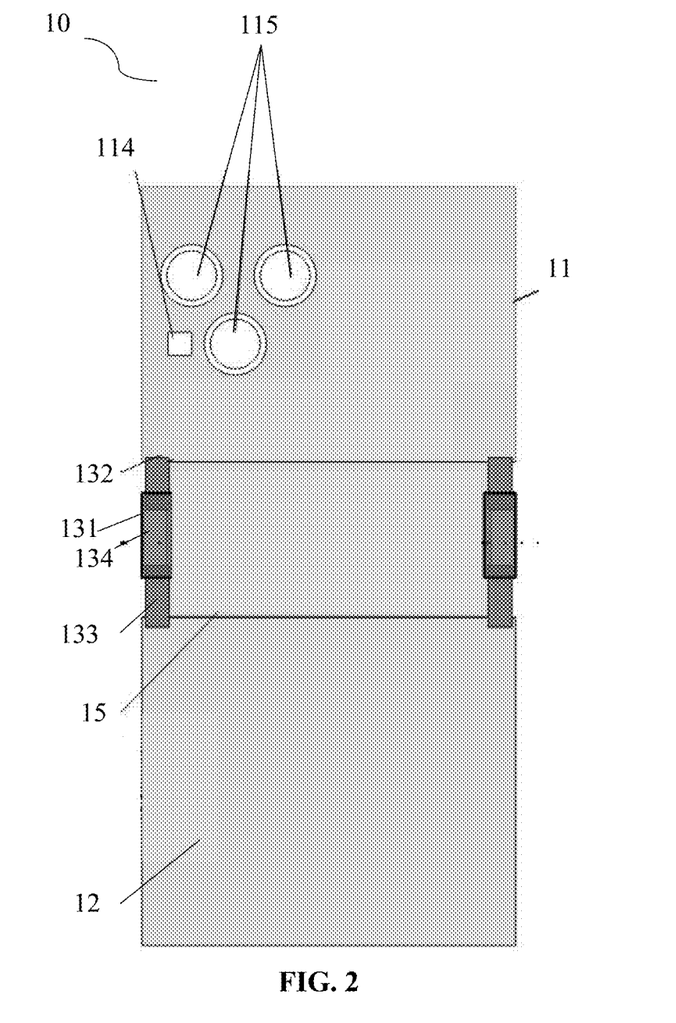
FIG. 2 is a second-angle schematic diagram of an inward folding electronic device in an unfolded state according to an embodiment of this application.
Figure 3:
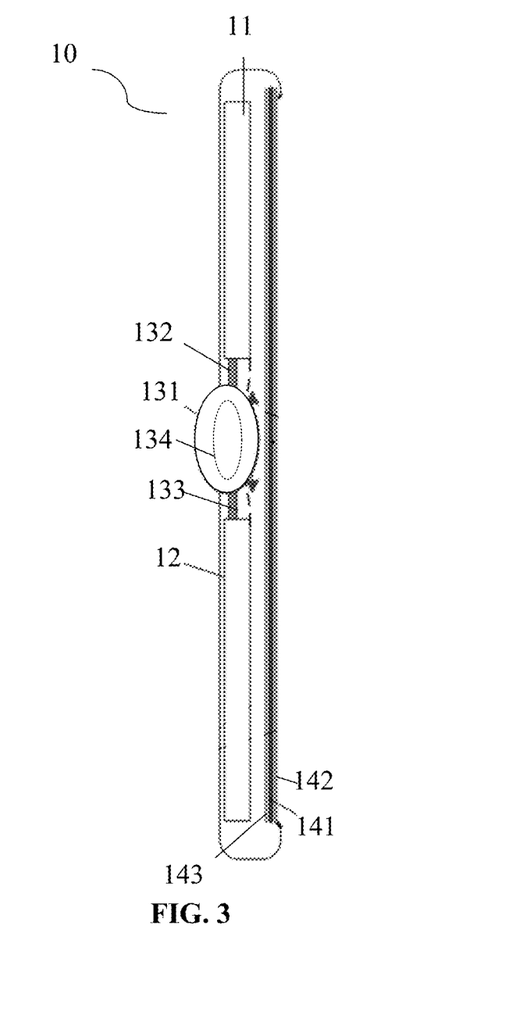
FIG. 3 is a third-angle schematic view of an inward folding electronic device in an unfolded state according to an embodiment of this application.
Figure 4:
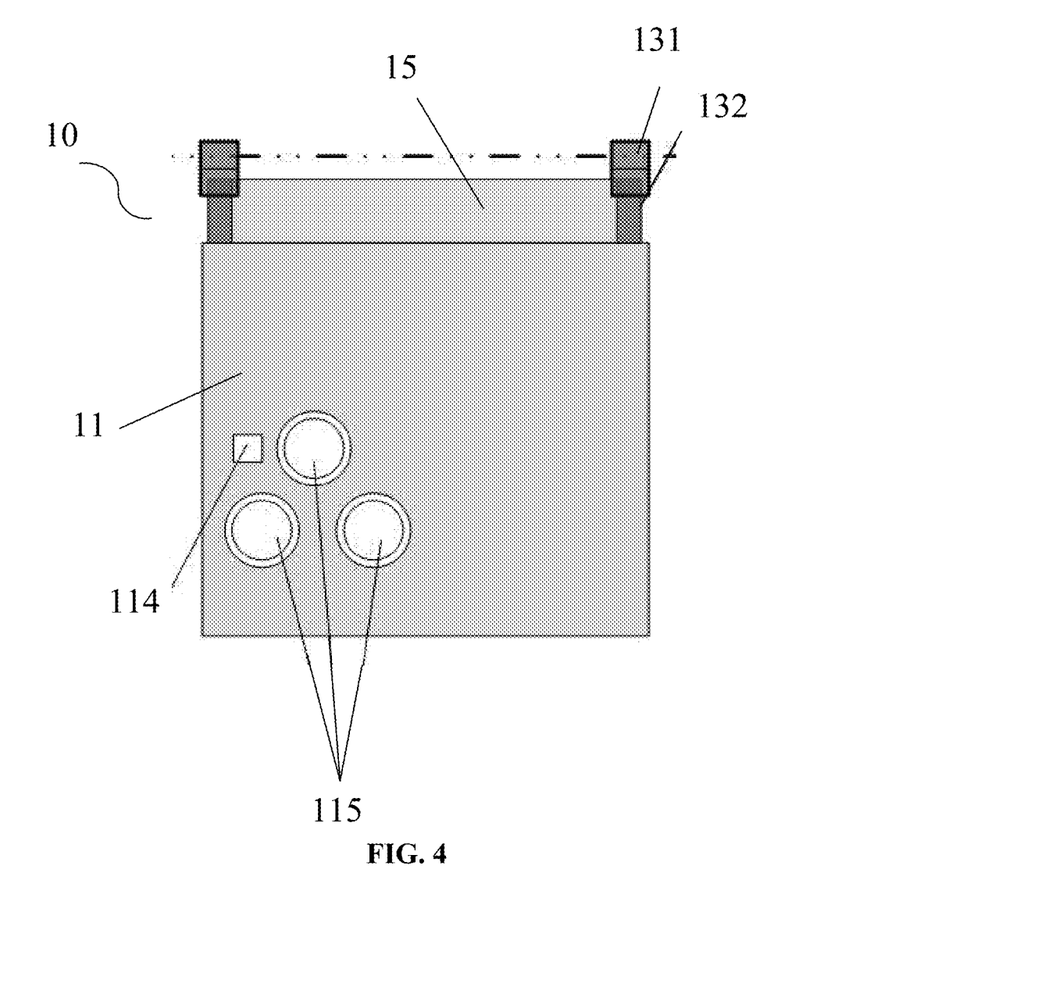
FIG. 4 is a first-angle schematic diagram of an inward folding electronic device in a folded state according to an embodiment of this application.
Figure 5:
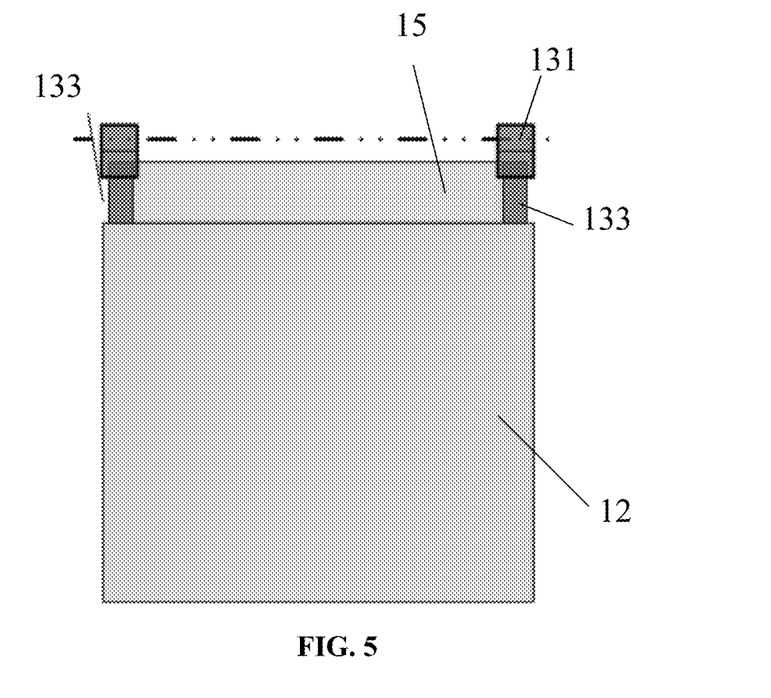
FIG. 5 is a second-angle schematic diagram of an inward folding electronic device in a folded state according to an embodiment of this application.
Figure 6:
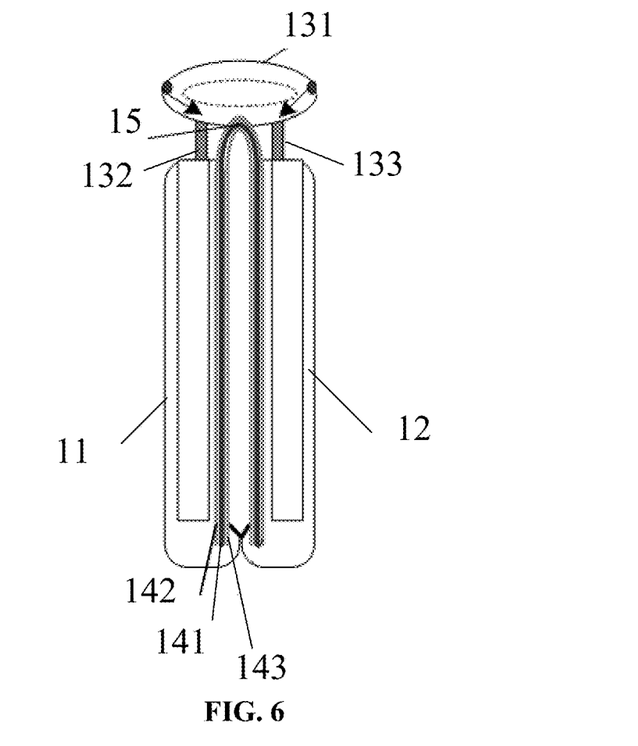
FIG. 6 is a third-angle schematic diagram of an inward folding electronic device in a folded state according to an embodiment of this application.

Optionally, as shown in FIGS. 2 and 3, the inward folding electronic device 10 provided in the embodiments of this application further includes a light sensor 111, a front-facing camera 112, and a receiver 113 provided on the side of the first housing 11 facing towards the flexible display module 14; and further includes a supplementary light 114 and a rear-facing camera 115 provided on the side of the first housing 11 farther away from the flexible display module 14.

An embodiment of this application further provides a display control method for controlling the display of the inward folding electronic device described above, where the method includes steps 100 and 200.

In the embodiment of this application, the method is applied to the inward folding electronic device, where the electronic device may be a mobile electronic device such as a mobile phone, a tablet computer, a notebook computer, a palmtop computer, a vehicle-mounted electronic device, a wearable device, an ultra-mobile personal computer (UMPC), a netbook, a personal digital assistant (PDA), and the like; and may be a non-mobile electronic device such as a personal computer (PC), a television (TV), a teller machine, a self-service machine, or the like.

Step 100. Control the semi-transparent and semi-reflective display area to display first display content towards a first direction in a case that the inward folding electronic device is in an unfolded state; where the first direction is a direction of a side of the semi-transparent and semi-reflective display area facing away from the first housing and the second housing.

In step 100, in a case that the inward folding electronic device is in the unfolded state, that is, in a case that the first housing and second housing are unfolded, in the direction in which the semi-transparent and semi-reflective display area is in a reflective display state, that is, in the front direction of the flexible display module, content displayed on the entire flexible display module can be observed normally. Therefore, the semi-transparent and semi-reflective display area is controlled to display the first display content towards the first direction, so that the content displayed on the entire flexible display module can be observed from the front.

Step 200. Control the semi-transparent and semi-reflective display area to display second display content towards a second direction in a case that the inward folding electronic device is in a folded state; where the second direction is a direction of the semi-transparent and semi-reflective display area facing towards the first housing and the second housing.

In step 200, in a case that the inward folding electronic device is in the folded state, that is, in a case that the first housing and second housing are folded together, in the direction in which the semi-transparent and semi-reflective display area is in a reflective display state, that is, in the front direction of the flexible display module, content displayed on the entire flexible display module cannot be observed normally. In addition, the back of the flexible display module is blocked by the first housing and second housing, except for the first area. Therefore, the semi-transparent and semi-reflective display area corresponding to the connecting area is controlled to display the second display content towards the direction of transmittance display, so that the content displayed on the semi-transparent and semi-reflective display area can be observed from the back of the flexible display module.

The display control method provided in the embodiment of this application allows for controlling the semi-transparent and semi-reflective display area to display content towards different directions depending on the folded or unfolded state of the inward folding electronic device, enabling users to conveniently observe the displayed content without experiencing mirror display.

Optionally, an embodiment of this application further provides an electronic device, where the electronic device is the above inward folding electronic device, including a processor, a memory, and a program or instructions stored in the memory and capable of running on the processor. When the program or instructions are executed by the processor, the processes of the foregoing embodiment of the display control method are implemented, with the same technical effects achieved. To avoid repetition, details are not described herein again.

It should be noted that the electronic device in this embodiment of this application includes the foregoing mobile electronic device and non-mobile electronic device.

Figure 9:
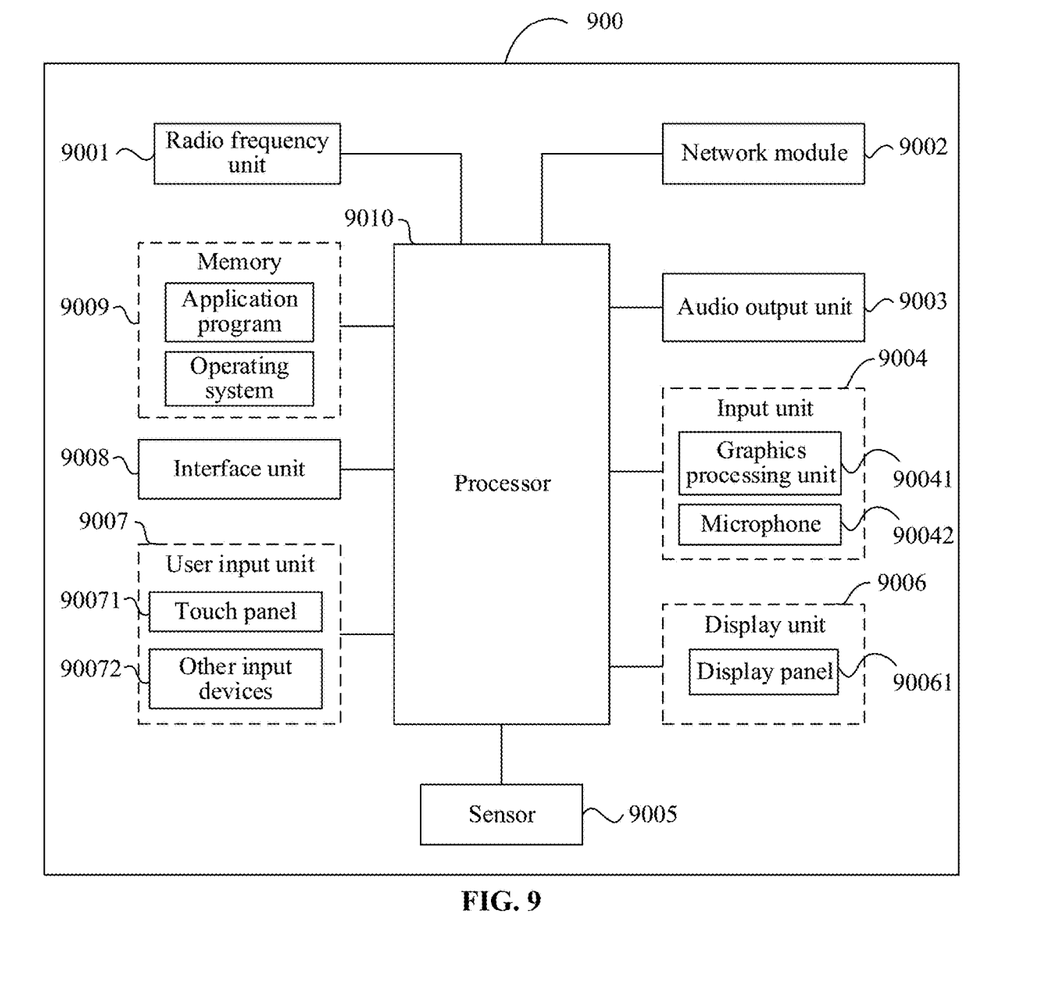
FIG. 9 is a schematic structural diagram of an electronic device according to an embodiment of this application.

FIG. 9 is a schematic diagram of a hardware structure of an electronic device according to an embodiment of this application.

The electronic device 900 includes but is not limited to components such as a radio frequency unit 9001, a network module 9002, an audio output unit 9003, an input unit 9004, a sensor 9005, a display unit 9006, a user input unit 9007, an interface unit 9008, a memory 9009, and a processor 9010.

Those skilled in the art can understand that the electronic device 900 may further include a power supply (for example, a battery) that supplies power to various components. The power supply may be logically connected to the processor 9010 through a power management system, so that functions such as charge and discharge management and power consumption management are implemented by using the power management system. The structure of the electronic device shown in FIG. 9 does not constitute a limitation on the electronic device. The electronic device may include more or fewer components than those shown in the figure, or some components may be combined, or there may be a different component layout. Details are not described herein again.

The display unit 9006 includes a display panel 90061, which in this embodiment of this application includes the foregoing flexible display module.

The processor 9010 is configured to control the semi-transparent and semi-reflective display area to display first display content towards a first direction in a case that the inward folding electronic device is in an unfolded state, where the first direction is a direction of a side of the semi-transparent and semi-reflective display area facing away from the first housing and the second housing; and controlling the semi-transparent and semi-reflective display area to display second display content towards a second direction in a case that the inward folding electronic device is in a folded state; where the second direction is a direction of a side of the semi-transparent and semi-reflective display area facing towards the first housing and the second housing;

The electronic device provided in the embodiment of this application allows for controlling the semi-transparent and semi-reflective display area to display content towards different directions depending on the folded or unfolded state of the inward folding electronic device, enabling users to observe displayed content without experiencing mirror display.

An embodiment of this application further provides a readable storage medium, where the readable storage medium stores a program or instructions, and when the program or instructions are executed by a processor, the processes of the foregoing display control method embodiments are implemented, with the same technical effects achieved. To avoid repetition, details are not described herein again.

The processor is the processor in the electronic device in the foregoing embodiments. The readable storage medium includes a computer-readable storage medium such as a computer read-only memory (ROM), a random access memory (RAM), a magnetic disk, or an optical disc.

Another embodiment of this application provides a chip, where the chip includes a processor and a communications interface, the communication interface is coupled to the processor, and the processor is configured to run a program or instructions to implement the processes of the foregoing display control method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An inward folding electronic device comprising a first housing, a second housing, and a flexible display module; wherein the flexible display module is provided on surfaces of the first housing and the second housing at one side, and a first area of the flexible display module is a semi-transparent and semi-reflective display area, wherein the first area is corresponding to a connecting area between the first housing and the second housing; and in a case that the electronic device is in an unfolded state, the semi-transparent and semi-reflective display area displays information at a side facing away from the first housing and the second housing; and in a case that the electronic device is in a folded state, the semi-transparent and semi-reflective display area displays information at a side facing towards the first housing and the second housing.

2. The inward folding electronic device according to claim 1, wherein a reflective functional layer of the semi-transparent and semi-reflective display area is located on a side of the semi-transparent and semi-reflective display area closer to the first housing and the second housing.

3. The inward folding electronic device according to claim 1, wherein the first housing and the second housing are pivotally connected.

4. The inward folding electronic device according to claim 3, wherein the electronic device further comprises at least two sets of hinge mechanisms, and the first housing and the second housing are pivotally connected through the at least two sets of hinge mechanisms, the hinge mechanism comprising a pivot, a first connecting hinge, and a second connecting hinge;

the pivot is provided with a groove inside;

one end of the first connecting hinge is fixedly connected to the first housing, and the other end of the first connecting hinge is embedded in the groove; and one end of the second connecting hinge is fixedly connected to the second housing, and the other end of the second connecting hinge is embedded in the groove.

5. The inward folding electronic device according to claim 4, wherein, in a case of two sets of hinge mechanisms, the two sets of hinge mechanisms are respectively provided on two sides of the flexible display module.

6. The inward folding electronic device according to claim 4, wherein an area on the first housing and the second housing corresponding to the first area is configured either as transparent or as a hollow area.

7. The inward folding electronic device according to claim 1, wherein the semi-transparent and semi-reflective display area comprises a substrate, and a pixel defining layer and a second electrode which are stacked in sequence on the substrate;

the pixel defining layer comprises a plurality of openings spaced apart, each of the openings being provided with a light-emitting unit;

a first electrode is provided between each light-emitting unit and the substrate, and the light-emitting unit emits light under the action of the first electrode and the second electrode;

the first electrode transmits, at least partially, the light emitted by the light-emitting unit, so that in a case that the electronic device is in a folded state, information is displayed on a side of the semi-transparent and semi-reflective display area facing towards the first housing and the second housing; and the second electrode transmits the light emitted by the light-emitting unit, so that in a case that the electronic device is in an unfolded state, information is displayed on a side of the semi-transparent and semi-reflective display area farther away from the first housing and the second housing.

8. The inward folding electronic device according to claim 7, further comprising an optical coating layer provided on a side of the substrate farther away from the first electrode, wherein the optical coating layer has a transmittance and reflectance of 50% each.

9. The inward folding electronic device according to claim 7, wherein the first electrode is a transparent electrode or a non-transparent electrode that has undergone openwork treatment.

10. The inward folding electronic device according to claim 7, wherein the first electrode is an anode, the second electrode is a cathode, and the second electrode is a common electrode.

11. A display control method, wherein the display control method is used for controlling the display of the inward folding electronic device according to claim 1, wherein the display control method comprises:

controlling the semi-transparent and semi-reflective display area to display first display content towards a first direction in a case that the inward folding electronic device is in an unfolded state; wherein the first direction is a direction of a side of the semi-transparent and semi-reflective display area facing away from the first housing and the second housing; and controlling the semi-transparent and semi-reflective display area to display second display content towards a second direction in a case that the inward folding electronic device is in a folded state; wherein the second direction is a direction of a side of the semi-transparent and semi-reflective display area facing towards the first housing and the second housing.

12. A chip, wherein the chip comprises a processor and a communication interface, the communication interface is coupled to the processor, and the processor is configured to run a program or instructions to implement the method according to claim 11.

13. A non-transitory readable storage medium, wherein the non-transitory readable storage medium stores a program or instructions, and when the program or instructions are executed by a processor, the steps of the display control method according to claim 11 are implemented.

14. An electronic device, comprising a first housing, a second housing, and a flexible display module; wherein the flexible display module is provided on surfaces of the first housing and the second housing at one side, and a first area of the flexible display module is a semi-transparent and semi-reflective display area, wherein the first area is corresponding to a connecting area between the first housing and the second housing; and in a case that the electronic device is in an unfolded state, the semi-transparent and semi-reflective display area displays information at a side facing away from the first housing and the second housing; and in a case that the electronic device is in a folded state, the semi-transparent and semi-reflective display area displays information at a side facing towards the first housing and the second housing;

wherein the electronic device further comprises a processor and a memory storing a program or an instruction that is capable of running on the processor, wherein the program or the instruction, when executed by the processor, causes the electronic device to perform:

controlling the semi-transparent and semi-reflective display area to display first display content towards a first direction in a case that the inward folding electronic device is in an unfolded state; wherein the first direction is a direction of a side of the semi-transparent and semi-reflective display area facing away from the first housing and the second housing; and controlling the semi-transparent and semi-reflective display area to display second display content towards a second direction in a case that the inward folding electronic device is in a folded state; wherein the second direction is a direction of a side of the semi-transparent and semi-reflective display area facing towards the first housing and the second housing.

15. The electronic device according to claim 14, wherein a reflective functional layer of the semi-transparent and semi-reflective display area is located on a side of the semi-transparent and semi-reflective display area closer to the first housing and the second housing.

16. The electronic device according to claim 14, wherein the first housing and the second housing are pivotally connected.

17. The electronic device according to claim 16, wherein the electronic device further comprises at least two sets of hinge mechanisms, and the first housing and the second housing are pivotally connected through the at least two sets of hinge mechanisms, the hinge mechanism comprising a pivot, a first connecting hinge, and a second connecting hinge;

the pivot is provided with a groove inside;

one end of the first connecting hinge is fixedly connected to the first housing, and the other end of the first connecting hinge is embedded in the groove; and one end of the second connecting hinge is fixedly connected to the second housing, and the other end of the second connecting hinge is embedded in the groove.

18. The electronic device according to claim 17, wherein, in a case of two sets of hinge mechanisms, the two sets of hinge mechanisms are respectively provided on two sides of the flexible display module.

19. The electronic device according to claim 17, wherein an area on the first housing and the second housing corresponding to the first area is configured either as transparent or as a hollow area.

20. The electronic device according to claim 14, wherein the semi-transparent and semi-reflective display area comprises a substrate, and a pixel defining layer and a second electrode which are stacked in sequence on the substrate;

the pixel defining layer comprises a plurality of openings spaced apart, each of the openings being provided with a light-emitting unit;

a first electrode is provided between each light-emitting unit and the substrate, and the light-emitting unit emits light under the action of the first electrode and the second electrode;

the first electrode transmits, at least partially, the light emitted by the light-emitting unit, so that in a case that the electronic device is in a folded state, information is displayed on a side of the semi-transparent and semi-reflective display area facing towards the first housing and the second housing; and the second electrode transmits the light emitted by the light-emitting unit, so that in a case that the electronic device is in an unfolded state, information is displayed on a side of the semi-transparent and semi-reflective display area farther away from the first housing and the second housing.

* * * * *